(12) United States Patent
McFarlane

(10) Patent No.: US 7,168,674 B2
(45) Date of Patent: Jan. 30, 2007

(54) AIRCRAFT SEAT TRACK REPAIR DEVICE

(76) Inventor: Daniel S McFarlane, 696 E. 1700 Rd., Baldwin City, KS (US) 66006

( * ) Notice: Subject to any disclaimer, the term of this patent is extended or adjusted under 35 U.S.C. 154(b) by 87 days.

(21) Appl. No.: 11/011,661

(22) Filed: Dec. 14, 2004

(65) Prior Publication Data

US 2006/0124821 A1    Jun. 15, 2006

(51) Int. Cl.
*F16M 11/00*    (2006.01)
(52) U.S. Cl. ........................ 248/694; 248/424
(58) Field of Classification Search ................ 248/424, 248/425, 429, 694; 296/65.13
See application file for complete search history.

(56) References Cited

FOREIGN PATENT DOCUMENTS

| EP | 1405786 A2 * | 4/2004 |
|---|---|---|
| WO | WO 2004026688 A1 * | 4/2006 |

* cited by examiner

*Primary Examiner*—Ramon O Ramirez
(74) *Attorney, Agent, or Firm*—David J. Archer

(57) ABSTRACT

A seat track repair device is disclosed for an aircraft seat track which has a rail, a support member depending from the rail, a first arm extending in a first direction laterally away from the support member and a second arm extending in a second direction laterally away from the support member, the first direction being opposite to the second direction. The seat track device includes an elongate member having a first and a second end. The elongate member has a replacement rail which has an upper and a lower extremity. A first wing extends laterally away from the lower extremity of the replacement rail and a second wing extends laterally away from the lower extremity of the replacement rail and away from the first wing. A fastener extends through one of the wings of the elongate member such that when the rail is removed from the depending support member and the first and second wings of the elongate member are aligned respectively with the first and second arms of the seat track, the fastener also extends through a corresponding adjacent arm of the support member for fastening the elongate member to the aircraft seat track.

12 Claims, 5 Drawing Sheets

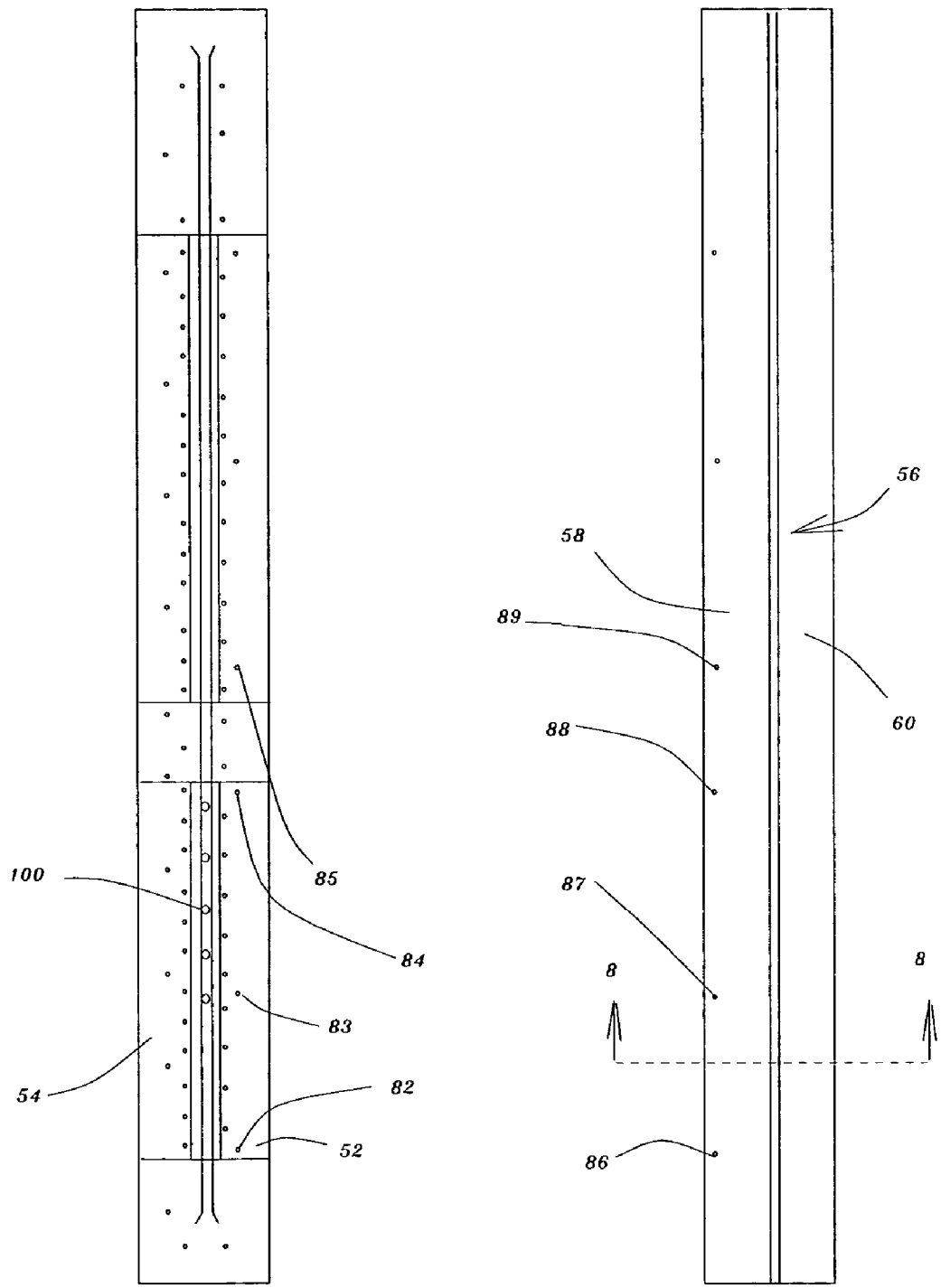

AIRCRAFT SEAT TRACK REPAIR DEVICE

BACKGROUND OF THE INVENTION

1. Field of the Invention

The present invention relates to an aircraft seat track repair device.

More specifically, the present invention relates to an aircraft seat track repair device for an aircraft seat track having a rail, a support member depending from the rail, a first arm extending in a first direction laterally away from the support member and a second arm extending in a second direction laterally away from the support member, the first direction being opposite to the second direction.

2. Background Information

Aircraft seats for crew members and passengers are provided with means for adjustably sliding the seat on a pair of rails so that the position of the seat can be varied.

However, because the aircraft is used by various pilots, passengers and crew, the seat is frequently adjusted which causes rapid wear of the seat supporting rails. The replacement of such worn rails is a labor intensive operation and is thus a relatively expensive maintenance item. For example in the replacement of seat support rails or tracks for a Cessna Citation jet aircraft, the replacement of worn rails necessitates a major operation which includes accessing the frame structure in the aircraft cabin and the unriveting, cutting and splicing of numerous structures after the removal of the aircraft seats and the floorboarding.

The present invention provides a seat track replacement kit which greatly simplifies the replacement of worn rails by cutting off the worn rail and replacing the same with a replacement rail which is fastened to the base portion of the original rail.

Therefore, a primary feature of the present invention is the provision of an aircraft seat track repair device that overcomes the problems associated with the prior art arrangements.

Another feature of the present invention is the provision of an aircraft seat track repair device that greatly simplifies the replacement of worn seat tracks.

A further feature of the present invention is the provision of an aircraft seat track repair device that reduces the cost of replacement of worn seat tracks.

Other features and advantages of the present invention will be readily apparent to those skilled in the art by a consideration of the detailed description of a preferred embodiment of the present invention contained herein.

SUMMARY OF THE INVENTION

The present invention relates to an aircraft seat track repair device for an aircraft seat track which has a rail, a support member depending from the rail, a first arm extending in a first direction laterally away from the support member and a second arm extending in a second direction laterally away from the support member, the first direction being opposite to the second direction. The seat track device includes an elongate member having a first and a second end. The elongate member has a replacement rail which has an upper and a lower extremity. A first wing extends laterally away from the lower extremity of the replacement rail and a second wing extends laterally away from the lower extremity of the replacement rail and away from the first wing. A fastener extends through one of the wings of the elongate member such that when the rail is removed from the depending support member and the first and second wings of the elongate member are aligned respectively with the first and second arms of the seat track, the fastener also extends through a corresponding adjacent arm of the support member for fastening the elongate member to the aircraft seat track.

In a more specific embodiment of the present invention, the elongate member is a metal extrusion of inverted T-shaped configuration.

Also, the replacement rail is of substantially a same cross-sectional configuration as the rail removed from the depending support member.

Furthermore, the lower extremity of the replacement rail defines a cavity which extends from the first to the second end of the elongate member such that when the elongate member is aligned with the arms of the seat track after the removal of the rail, any remaining portion of the rail is accommodated within the cavity such that the first and second wings of the elongate member are permitted to lie flat against the first and second arms respectively of the seat track while inhibiting any relative rocking motion between the elongate member and the seat track.

Additionally, the wings define a plurality of predrilled holes for the reception therethrough of the fastener.

Also, a floorboard support cooperates with the elongate member and the seat track, the floorboard support having a first and a second portion The first portion of the floorboard support cooperates with the elongate member such that when the rail is removed from the depending support member and the first and second wings of the elongate member are aligned respectively with the first and second arms of the seat track, one of the arms of the seat track is sandwiched between the first portion of the floorboard support and a corresponding adjacent wing of the elongate member.

Additionally, the floorboard support is an elongate metallic extrusion and the first portion of the floorboard support is drilled to define a number of apertures, each aperture being aligned with a corresponding hole of the wings so that when the wings of the elongate member are aligned with the first portion of the floorboard support, drilling through the intervening arm of the seat track and through the first portion permits insertion of the fastener for fastening the floorboard support and the elongate member to the seat track.

Moreover, the floorboard support supports a floorboard such that when the rail has been replaced by the replacement rail, an edge of the floorboard abuts against one of the wings of the elongate member while the floorboard is supported by the second portion of the floorboard support.

Also, the fastener includes a threaded shank portion having a first and a second end. A head extends from the first end of the threaded shank portion and a nut threadably cooperates with the shank portion.

The present invention also includes a method of repairing a seat track for an aircraft seat track having a rail, a support member depending from the rail, a first arm extending in a first direction laterally away from the support member and a second arm extending in a second direction laterally away from the support member, the first direction being opposite to the second direction. The method includes the steps of cutting off a worn rail of the seat track and aligning an elongate member having a first and a second end so that the elongate member is aligned relative to the arms of the seat track. The elongate member includes a replacement rail having an upper and a lower extremity. A first wing extends laterally away from the lower extremity of the replacement rail and a second wing extends laterally away from the lower extremity of the replacement rail and away from the first wing. The method also includes the step of positioning a floorboard support such that the support cooperates with the elongate member and the seat track, the floorboard support having a first and a second portion. The first portion of the floorboard support cooperates with the elongate member such that when the rail is removed from the depending support member and the first and second wing of the elongate member are aligned respectively with the first and second arm of the seat track, one of the arms of the seat track is sandwiched between the first portion of the floorboard support and a corresponding wing of the elongate member. Additionally, the method includes the step of inserting a fastener through the corresponding wing, the one of the arms and the first portion of the floorboard support for fastening the elongate member and the floorboard support to the seat track.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

FIG. 6 is an enlarged top plan view of the seat track device shown in FIG. 4;

FIG. 7 is a plan view of the the floorboard support shown in FIG. 4;

Similar reference characters refer to similar parts throughout the various views of the drawings.

DETAILED DESCRIPTION OF THE DRAWINGS

Figure 1:
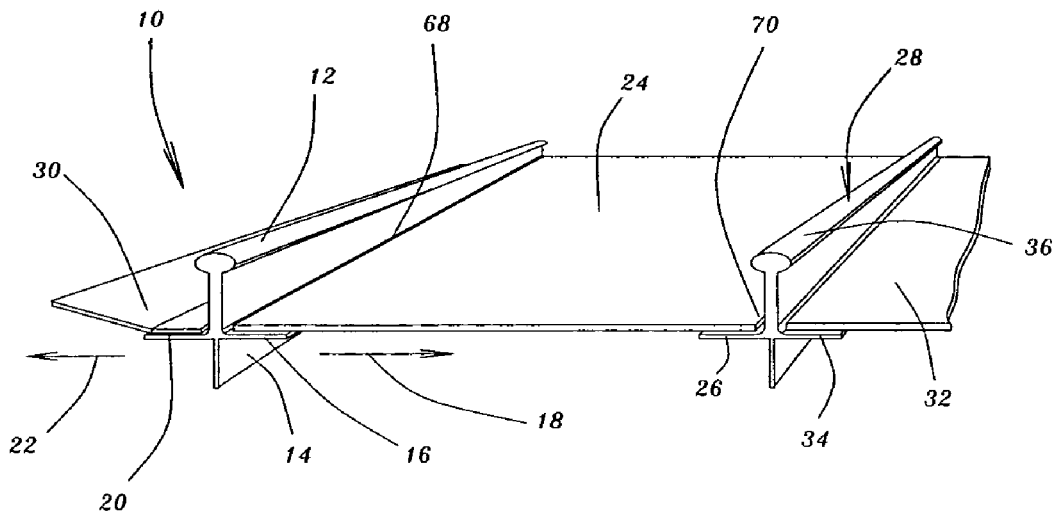
FIG. 1 is a perspective view of an aircraft seat track with the seat removed therefrom.

FIG. 1 is a perspective view of an aircraft seat track generally designated 10 with the seat removed therefrom. As shown in FIG. 1, the aircraft seat track 10 has a rail 12, a support member 14 depending from the rail 12, a first arm 16 extending in a first direction as indicated by the arrow 18 laterally away from the support member 14 and a second arm 20 extending in a second direction as indicated by the arrow 22 laterally away from the support member 14. As shown in FIG. 1, the first direction 18 is opposite to the second direction 22.

Also, as shown in FIG. 1, an outboard floorboard 24 is supported by and extends between the first arm 16 and a further second arm 26 of a further seat track 28. The further seat track 28 as shown in FIG. 1 is disposed parallel to the seat track 10. Additionally, an outboard fairing 30 extends between the second arm 20 and the wall (not shown) of the aircraft. Furthermore, an inboard floorboard 32 is supported by a further first arm 34 of the further seat track 28.

Figure 2:
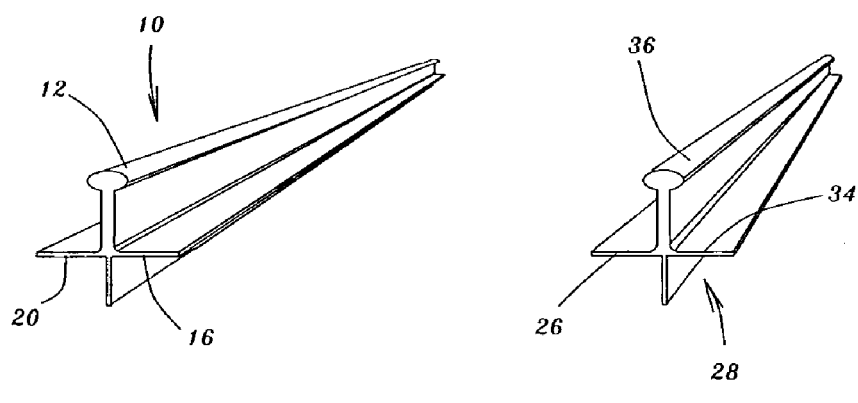
FIG. 2 is a similar view to that shown in FIG. 1 but with the outboard floorboard, the outboard fairing and the inboard floorboard having been removed.

FIG. 2 is a similar view to that shown in FIG. 1. However, as shown in FIG. 2, the outboard floorboard 24, the outboard fairing 30 and the inboard floorboard 32 have been removed.

Figure 3:
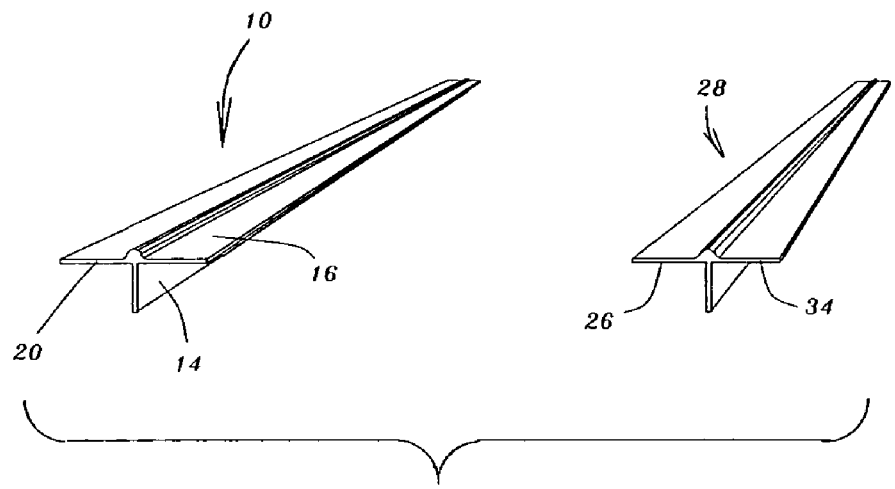
FIG. 3 is a similar view to that shown in FIG. 2 but with the worn rail of a seat track and a further worn rail of a further seat track having been removed.

FIG. 3 is a similar view to that shown in FIG. 2. However, as shown in FIG. 3 the worn rail 12 of the seat track 10 and a further worn rail 36 of the further seat track 28 as shown in FIGS. 1–2 have been removed. The worn rails 12 and 36 are removed by longitudinally cutting the worn rails 12 and 36 just above the arms 16, 20 in the case of the worn rail 12 and just above the further first and second arms 34 and 26 respectively in the case of the further worn rail 36.

Figure 4:
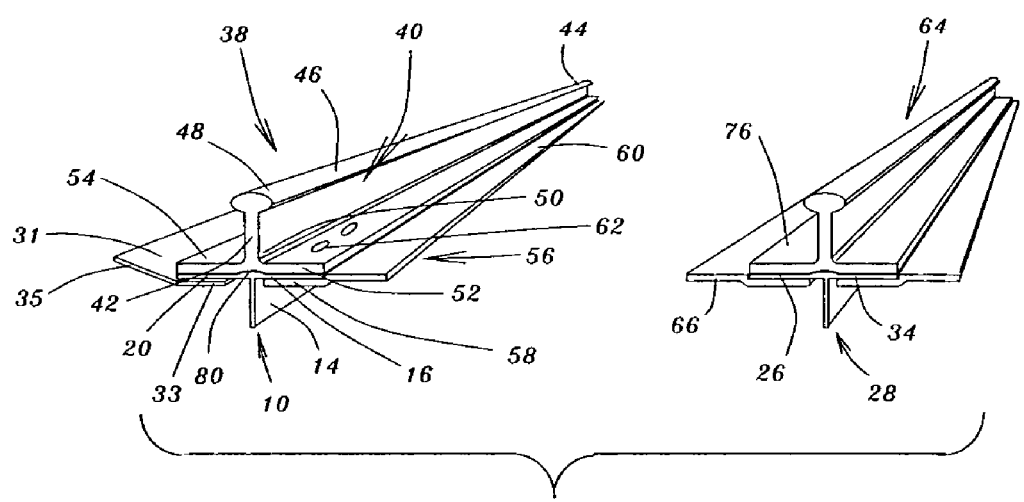
FIG. 4 is a similar view to that shown in FIG. 3 but shows the application of a seat track device according to the present invention.

FIG. 4 is a similar view to that shown in FIG. 3. However, as shown in FIG. 4, a seat track device generally designated 38 according to the present invention is provided. As shown in FIG. 4, the seat track device 38 includes an elongate member generally designated 40 having a first and a second end 42 and 44 respectively. The elongate member 40 has a replacement rail 46 which includes an upper and a lower extremity 48 and 50 respectively. A first wing 52 extends laterally away from the lower extremity 50 of the replacement rail 46. A second wing 54 also extends laterally away from the lower extremity 50 of the replacement rail 46 and away from the first wing 52. A floorboard support generally designated 56 cooperates with the elongate member 40 and the seat track 10, the floorboard support 56 having a first and a second portion 58 and 60 respectively. The first portion 58 of the floorboard support 56 cooperates with the elongate member 40. The arrangement is structured such that when the worn rail 12 is removed from the depending support member 14 as shown in FIG. 3, and the first and second wing 52 and 54 respectively of the elongate member 40 are aligned respectively with the first and second arm 16 and 20 of the seat track 10, one of the arms 16 of the seat track 10 is sandwiched between the first portion 58 of the floorboard support 56 and a corresponding wing 52 of the elongate member 40. A fastener generally designated 62 extends through the corresponding wing 52, the arm 16 and the first portion 58 of the floorboard support 56 for fastening the elongate member 40 and the floorboard support 56 to the seat track 10.

Also, as shown in FIG. 4, a further seat track device 64 which is substantially the same as the seat track device 38 is then secured in a similar manner to the further seat track 28 to replace the worn rail 36 shown in FIGS. 1–2. However, in the case of the further seat track device 64, another floorboard support 66 is secured to the further second arm 26.

Figure 5:
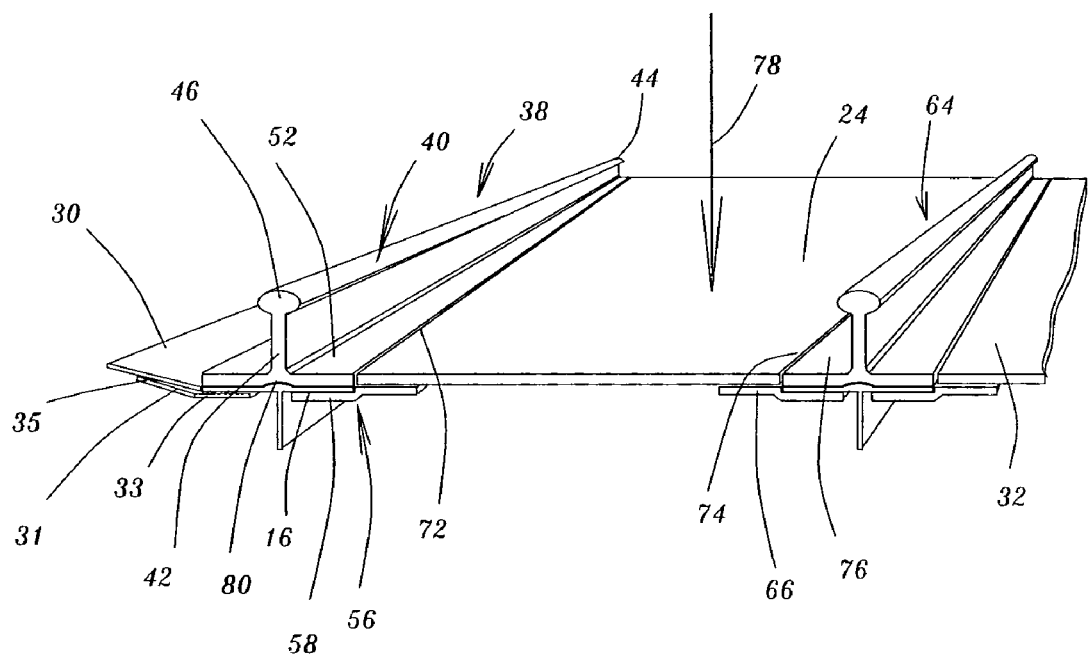
FIG. 5 is a similar view to that shown in FIG. 4 but shows the outboard floorboard and fairing having been replaced and supported by the floorboard supports.

FIG. 5 is a similar view to that shown in FIG. 4. However, as shown in FIG. 5, the outboard floorboard 24 is replaced as indicated by the arrow 78 and is supported by the floorboard supports 56 and 66 respectively. Nevertheless, in order to refit the outboard floorboard 24, it is necessary for the lateral edges 68 and 70 of the outboard floorboard 24 (shown in FIG. 1) to be trimmed down as shown in FIG. 5 so that the trimmed edges 72 and 74 respectively of the outboard floorboard 24 abut against the wings 52 and 76 of the seat track devices 38 and 64.

As shown in FIG. 5, the trimmed outboard floorboard 24 is replaced as indicated by the arrow 78. Additionally, as shown in FIG. 5, a fairing support 31 is secured to the second arm 20 so that the second arm 20 is disposed between an inside part 33 of the support 31 and the second wing 54. An outside part 35 of the support 31 supports the outboard fairing 30 which is suitably trimmed as shown in FIG. 5.

As shown particularly in FIGS. 4 and 5, the elongate member 40 is a metal extrusion of inverted T-shaped configuration.

Also, the replacement rail 46 is of substantially a same cross-sectional configuration as the worn rail 12 removed from the depending support member 14.

Moreover, the lower extremity 50 of the replacement rail 46 defines a cavity 80 which extends from the first to the second end 42 and 44 of the elongate member 40. The arrangement is such that when the elongate member 40 is aligned with the arms 16 and 20 of the seat track 10 after the removal of the worn rail 12, any remaining portion of the rail 12 is accommodated within the cavity 80 as shown in FIGS. 4 and 5. The device 38 is arranged such that the first and second wings 52 and 54 respectively of the elongate member 40 are permitted to lie flat against the first and second arms 16 and 20 respectively of the seat track 10 while inhibiting any relative rocking motion between the elongate member 40 and the seat track 10.

FIG. 6 is an enlarged top plan view of the seat track device 38. As shown in FIG. 6, the wings 52 and 54 define a plurality of predrilled holes 82, 83, 84 and 85 for the reception therethrough of corresponding fasteners including the fastener 62.

As shown in FIGS. 4 and 5, the floorboard support 56 is an elongate metallic extrusion.

FIG. 7 is a plan view of the the floorboard support 56. As shown in FIG. 7, when installed, as shown in FIGS. 4 and 5, the first portion 58 of the floorboard support 56 will after drilling define a number of apertures 86, 87, 88 and 89, each aperture 86–89 being aligned with a corresponding hole 82–85 of the wing 52 so that when the wings 52 and 54 of the elongate member 40 are aligned with the first portion 58 of the floorboard support 56, drilling through the intervening arm 16 of the seat track 10 permits insertion of the fastener 62 for fastening the floorboard support 56 and the elongate member 40 to the seat track 10.

Figure 8:
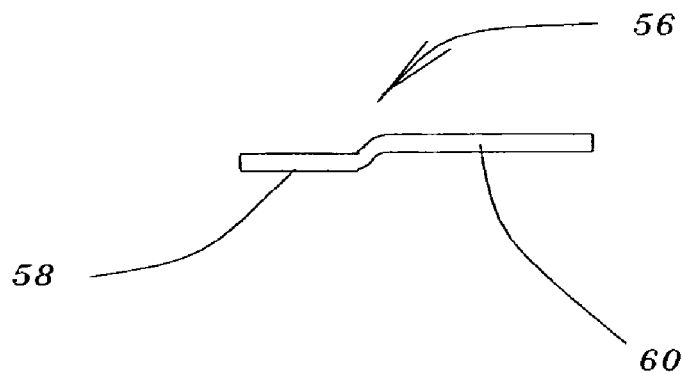
FIG. 8 is sectional view taken on the line 8—8 of FIG. 7.

FIG. 8 is sectional view taken on the line 8—8 of FIG. 7. As shown in FIG. 8, the support 56 includes the first and second portions 58 and 60 respectively.

Figure 9:
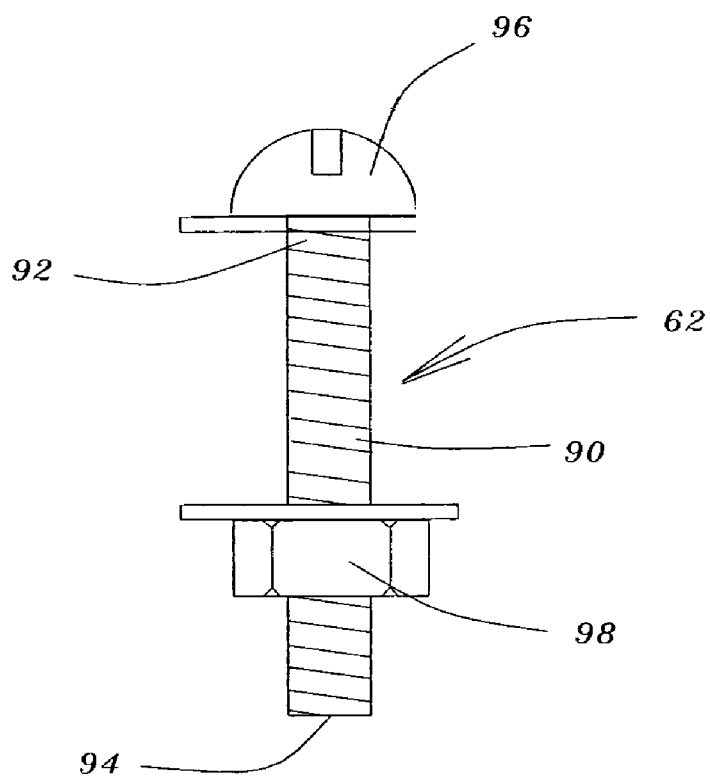
FIG. 9 is an enlarged side elevational view of the fastener for fastening the seat track device to the seat track.

FIG. 9 is an enlarged side elevational view of the fastener 62. As shown in FIG. 9, the fastener generally designated 62 includes a threaded shank portion 90 having a first and a second end 92 and 94 respectively. A head 96 extends from the first end 92 of the threaded shank portion 90. Additionally, a nut 98 threadably cooperates with the shank portion 90. A plurality of fasteners 62 corresponding with the number of holes 82–85 is provided as shown in FIG. 6.

As shown in FIG. 5, the floorboard support 56 supports the floorboard 24 such that when the worn rail 12 has been replaced by the replacement rail 46, an edge 72 of the floorboard 24 abuts against one of the wings 52 of the elongate member 40 while the floorboard 24 is supported by the second portion 60 of the floorboard support 56.

In operation of the device according to the present invention, the crew seats are removed from the cabin. The floorboard fasteners are located and with a set square, a line is drawn from the fasteners so that when the edges of the floorboard are trimmed, the location of the fastening points is maintained. Next, the outboard and inboard floorboards 24 and 32 and the side fairing 30 are removed. All of the instruments and sensitive equipment is masked to protect the same from any metal fragments generated during removal of the worn rails. The worn track of the rail 12 is removed by use of a cutting tool and by cutting the web below the track in a longitudinal direction. Any remaining portion of the web remaining after removal of the worn rail track is accommodated within the cavity 80. The first portion 58 of the support 56 is temporarily clamped with the arm 16 disposed between the wing 52 and the first portion 58 as shown in FIG. 5. The apertures 86–89 are then drilled using the holes 82–85 as a template so that both the arm 16 and the first portion 58 of the support is drilled. Next the fasteners 62 are inserted through the aligned holes and apertures for fastening the elongate member 40 and the support 56 to the seat track 10. When all of the worn rails have been replaced, the floorboards 24 and 32 and the fairing 30 are trimmed so that the trimmed edges 72 and 74 abut against the corresponding wings 52 and 76 of the seat track devices. Also, the fairing 30, after trimming, is replaced as shown, the fairing 30 being supported by the support 31.

The replacement rail 46 is of substantially the same configuration as the rail 12 and includes a number of seat adjustment holes such as hole 100 shown in FIG. 6 for locking the seat against forward or rearward movement until controllably released.

The present invention provides a unique arrangement for replacing worn rails of an aircraft crew seat.

What is claimed is:

1. A seat track repair device for an aircraft seat track which has a rail, a support member depending from the rail, a first arm extending in a first direction laterally away from the support member and a second arm extending in a second direction laterally away from the support member, the first direction being opposite to the second direction, said seat track device comprising:
    an elongate member having a first and a second end;
    said elongate member including:
    a replacement rail having an upper and a lower extremity;
    a first wing extending laterally away from said lower extremity of said replacement rail;
    a second wing extending laterally away from said lower extremity of said replacement rail and away from said first wing; and
    a fastener extending through one of said wings of said elongate member such that when the rail is removed from the depending support member and said first and second wings of said elongate member are aligned respectively with the first and second arms of the seat track, said fastener also extends through a corresponding adjacent arm of the support member for fastening said elongate member to the aircraft seat track.

2. A seat track repair device as set forth in claim 1 wherein said elongate member is a metal extrusion of inverted T-shaped configuration.

3. A seat track repair device as set forth in claim 1 wherein said replacement rail is of substantially a same cross-sectional configuration as the rail removed from the depending support member.

4. A seat track repair device as set forth in claim 1 wherein said lower extremity of said replacement rail defines a cavity which extends from said first to said second end of said elongate member such that when said elongate member is aligned with the arms of the seat track after the removal of the rail, any remaining portion of the rail is accommodated within said cavity such that said first and second wings of said elongate member are permitted to lie flat against the first and second arms respectively of the seat track while inhibiting any relative rocking motion between said elongate member and the seat track.

5. A seat track repair device as set forth in claim 1 wherein said wings define a plurality of predrilled holes for the reception therethrough of said fastener.

6. A seat track repair device as set forth in claim 1 further including:
   a floorboard support cooperating with said elongate member and the seat track, said floorboard support having a first and a second portion;
   said first portion of said floorboard support cooperating with said elongate member such that when the rail is removed from the depending support member and said first and second wings of said elongate member are aligned respectively with the first and second arms of the seat track, one of the arms of the seat track is sandwiched between said first portion of said floorboard support and a corresponding adjacent wing of said elongate member.

7. A seat track repair device as set forth in claim 6 wherein said floorboard support is an elongate metallic extrusion.

8. A seat track repair device as set forth in claim 6 wherein said first portion of said floorboard support is drilled to define a number of apertures, each aperture being aligned with a corresponding hole of said wings so that when said wings of said elongate member are aligned with said first portion of said floorboard support, drilling through the intervening arm of the seat track and through said first portion permits insertion of said fastener for fastening said floorboard support and said elongate member to the seat track.

9. A seat track repair device as set forth in claim 6 wherein said floorboard support supports a floorboard such that when the rail has been replaced by said replacement rail, an edge of said floorboard abuts against one of said wings of said elongate member while said floorboard is supported by said second portion of said floorboard support.

10. A seat track repair device as set forth in claim 1 wherein
    said fastener includes:
    a threaded shank portion having a first and a second end;
    a head extending from said first end of said threaded shank portion;
    a nut threadably cooperating with said shank portion.

11. A seat track repair device for an aircraft seat track which has a rail, a support member depending from the rail, a first arm extending in a first direction laterally away from the support member and a second arm extending in a second direction laterally away from the support member, the first direction being opposite to the second direction, said seat track device comprising:
    an elongate member having a first and a second end;
    said elongate member including:
    a replacement rail having an upper and a lower extremity;
    a first wing extending laterally away from said lower extremity of said replacement rail;
    a second wing extending laterally away from said lower extremity of said replacement rail and away from said first wing;
    a floorboard support cooperating with said elongate member and the seat track, said floorboard support having a first and a second portion;
    said first portion of said floorboard support cooperating with said elongate member such that when the rail is removed from the depending support member and said first and second wing of said elongate member are aligned respectively with the first and second arm of the seat track, one of the arms of the seat track is sandwiched between said first portion of said floorboard support and a corresponding wing of said elongate member;
    a fastener extending through said corresponding wing, said one of the arms and said first portion of said floorboard support for fastening said elongate member and said floorboard support to the seat track; and
    said elongate member being a metal extrusion of inverted T-shaped configuration.

12. A method of repairing a seat track for an aircraft seat track which has a rail, a support member depending from the rail, a first arm extending in a first direction laterally away from the support member and a second arm extending in a second direction laterally away from the support member, the first direction being opposite to the second direction, said method comprising the steps of:
    cutting off a worn rail of the seat track;
    aligning an elongate member having a first and a second end so that the elongate member is aligned relative to the arms of the seat track, the elongate member including:
    a replacement rail having an upper and a lower extremity;
    a first wing extending laterally away from the lower extremity of the replacement rail;
    a second wing extending laterally away from the lower extremity of the replacement rail and away from the first wing;
    positioning a floorboard support such that the support cooperates with the elongate member and the seat track, the floorboard support having a first and a second portion, the first portion of the floorboard support cooperating with the elongate member such that when the rail is removed from the depending support member and the first and second wing of the elongate member are aligned respectively with the first and second arm of the seat track, one of the arms of the seat track is sandwiched between the first portion of the floorboard support and a corresponding wing of the elongate member; and
    inserting a fastener through the corresponding wing, the one of the arms and the first portion of the floorboard support for fastening the elongate member and the floorboard support to the seat track.

* * * * *